US011675724B2

(12) United States Patent
Maroney et al.

(10) Patent No.: US 11,675,724 B2
(45) Date of Patent: *Jun. 13, 2023

(54) MEMORY SUB-SYSTEM WITH MULTIPLE PORTS HAVING SINGLE ROOT VIRTUALIZATION

(71) Applicant: Micron Technology, Inc., Boise, ID (US)

(72) Inventors: John E. Maroney, Irvine, CA (US); Christopher J. Bueb, Folsom, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/543,665

(22) Filed: Dec. 6, 2021

(65) Prior Publication Data

US 2022/0092013 A1 Mar. 24, 2022

Related U.S. Application Data

(63) Continuation of application No. 16/711,337, filed on Dec. 11, 2019, now Pat. No. 11,194,750.
(Continued)

(51) Int. Cl.
*G06F 13/40* (2006.01)
*G06F 13/16* (2006.01)
(Continued)

(52) U.S. Cl.
CPC .......... *G06F 13/4027* (2013.01); *G06F 9/455* (2013.01); *G06F 12/10* (2013.01);
(Continued)

(58) Field of Classification Search
CPC ...... G06F 13/40; G06F 13/16; G06F 13/4027; G06F 9/455
See application file for complete search history.

(56) References Cited

U.S. PATENT DOCUMENTS 5,706,034 A 1/1998 Katsura et al.
2012/0166690 A1 6/2012 Regula
(Continued)

FOREIGN PATENT DOCUMENTS

KR 20160016557 A 2/2016

OTHER PUBLICATIONS

PCT International Search Report and Written Opinion for International Application No. PCT/US2019066065, dated Apr. 14, 2020, 11 pages.

*Primary Examiner* — Henry Tsai
*Assistant Examiner* — Christopher A Daley
(74) *Attorney, Agent, or Firm* — Lowenstein Sandler LLP (57) ABSTRACT

A processing device to perform operations including detecting a first host system connected to a first interface port of a plurality of interface ports of a memory device, detecting a second host system connected to a second interface port of the plurality of interface ports, allocating a first range of logical block addresses (LBA) to one or more virtual functions (VFs) assigned to the first host system, and allocating a second range of LBAs to one or more VFs assigned to the second host system, wherein the first host system is to access the first range of LBA of the memory device concurrently with the second host system accessing the second range of LBA of the memory device, and wherein the first range of LBAs is different than the second range of LBAs.

20 Claims, 6 Drawing Sheets

Related U.S. Application Data

(60) Provisional application No. 62/778,515, filed on Dec. 12, 2018.

(51) Int. Cl.
*G06F 12/10* (2016.01)
*G06F 9/455* (2018.01)
*G06F 13/42* (2006.01)

(52) U.S. Cl.
CPC ...... *G06F 13/1668* (2013.01); *G06F 13/4282* (2013.01); *G06F 2212/657* (2013.01); *G06F 2213/0026* (2013.01)

(56) References Cited

U.S. PATENT DOCUMENTS

| | | |
|---|---|---|
| 2013/0160002 A1 | 6/2013 | Graham et al. |
| 2014/0019969 A1 | 1/2014 | Goggin et al. |
| 2014/0068317 A1 | 3/2014 | Kanigicherla et al. |
| 2014/0331223 A1 | 11/2014 | Lee et al. |
| 2015/0169487 A1 | 6/2015 | Subramaniyan et al. |
| 2017/0134310 A1 | 5/2017 | Koladi et al. |
| 2019/0020501 A1 | 1/2019 | Yu et al. |
| 2019/0042329 A1 | 2/2019 | Kakaiya et al. |

MEMORY SUB-SYSTEM WITH MULTIPLE PORTS HAVING SINGLE ROOT VIRTUALIZATION

CROSS-REFERENCE TO RELATED APPLICATIONS

This application is a continuation application of co-pending U.S. patent application Ser. No. 16/711,337, filed Dec. 11, 2019, which claims the benefit of priority from U.S. Provisional Application No. 62/778,515, filed on Dec. 12, 2018, each of which is incorporated herein by reference.

TECHNICAL FIELD

The present disclosure generally relates to a memory system, and more specifically, relates to memory sub-system with multiple ports having single root virtualization.

BACKGROUND

A memory sub-system can include one or more memory components that store data. The memory components can be, for example, non-volatile memory components and volatile memory components. In general, a host system can utilize a memory sub-system to store data at the memory components and to retrieve data from the memory components.

BRIEF DESCRIPTION OF THE DRAWINGS

The present disclosure will be understood more fully from the detailed description given below and from the accompanying drawings of various embodiments of the disclosure.

DETAILED DESCRIPTION

Aspects of the present disclosure are directed to supporting multiple ports having single root input/output (I/O) virtualization in a memory sub-system. A memory sub-system can be a storage device, a memory module, or a hybrid of a storage device and memory module. Examples of storage devices and memory modules are described below in conjunction with FIG. 1. In general, a host system can utilize a memory sub-system that includes one or more memory components, such as memory devices that store data. The host system can provide data to be stored at the memory sub-system and can request data to be retrieved from the memory sub-system.

In a conventional memory sub-system, a single interface port can be used to transmit data between the memory sub-system and a host system. Multiple hosts (e.g., different system on a chip (SOC) devices) with multiple virtual machines can interact with the memory sub-system. A virtual machine can be an emulation of a physical host system or other such physical resources of a host system. Thus, the memory sub-system can be used to store and retrieve data for the different virtual machines that are provided by the multiple host systems. In order to manage the transmission of data from the memory devices of the memory sub-system to the different virtual machines at the different host systems, the storage resources of the memory sub-system can be shared through the use of a single interface port that utilizes a single root input/output virtualization (SR-IOV). In some embodiments, the SR-IOV can provide the isolation of the resources of an interface, such as the Peripheral Component Interconnect Express (PCIe), which is used to read data from and write data to the memory sub-system by the different virtual machines. For example, the SR-IOV can provide different virtual functions (VFs) that are each assigned or used by a separate virtual machine.

If the conventional memory sub-system is to be used by multiple host systems, then the single interface port of the memory sub-system is used to share the storage resources of the memory sub-system with the different virtual machines of the different host systems. In order to manage the utilization of multiple host systems with the single interface port, a switch can be used as an intermediary between the memory sub-system and each of the host systems. For example, the switch can be a PCIe switch that provides access to the memory sub-system through the single interface port for each of the host systems. The switch can thus expose the single interface port that utilizes the single root input/output virtualization to each of the different host systems sequentially (i.e., during different access time periods). For example, all of the different virtual functions provided by the SR-IOV can be exposed to all the host systems. However, the utilization of a separate switch can add cost and power consumption expenses to the memory sub-system as the switch is a separate and discrete component that is to be coupled with the host systems. Additionally, the separate switch presents a risk of a single point of failure of the memory sub-system because all host systems are connected to the memory sub-system using the switch, thus a failure in the switch can cause all host systems to fail to connect to the memory sub-system.

Aspects of the present disclosure address the above and other deficiencies by introducing multiple interface ports in a memory sub-system, such that the memory sub-system can be shared for storage by multiple host systems. Each of the multiple interface ports supports single root virtualization. For example, multiple single root input/output virtualization (SR-IOV) enabled interface ports can be provided by the memory sub-system to enable access to multiple host systems without a need for a separate switch. An interface port can be a PCIe port or a physical port. The multiple interface ports of the memory sub-system can be accessed concurrently with each other, such that the multiple host systems can access the memory sub-system at the same time, or at least during partially overlapping access time periods. Each interface port (e.g., PCIe interface ports) can use SR-IOV to provide a separate group of virtual functions to each host system. In implementations, the memory sub-system can have a maximum number of virtual functions that can be provided by the memory sub-system. Therefore, if the memory sub-system provides a large number of interface ports, each port can be assigned a fewer number of virtual functions, such that the total number of virtual functions assigned to all ports does not exceed the maximum number of virtual functions supported by the memory sub-system. Similarly, if the memory sub-system provides a fewer number of interface ports, each port can be assigned more of the total virtual functions of the memory sub-system.

In some embodiments, the memory sub-system can include two or more SR-IOV enabled interface ports. For example, the memory sub-system can be utilized by two or more host systems where multiple virtual machines can be running on each host system. Each interface port (e.g., a PCIe port) can be SR-IOV enabled and thus can provide a group of virtual functions to the virtual machines of one of the host systems. SR-IOV is a specification that allows the isolation of peripheral component interconnect (PCI) Express (PCIe) resources among various hardware functions for manageability and performance reasons, while also allowing a single physical PCIe device to be shared in a virtual environment. SR-IOV offers different virtual functions (VFs) to different virtual components (e.g., a network adapter) on a physical server machine. SR-IOV also allows different virtual machines in a virtual environment to share a single PCIe hardware interface.

In one implementation, the memory sub-system can provide an identification of each interface port (e.g., an address or other such identification) and a group of virtual functions supported by the SR-IOV enabled interface port to a group of virtual machines of a host system. Each virtual machine of the host system can be assigned one virtual function of the interface port. As such, since the memory sub-system provides multiple interface ports and each port exposes a separate group of virtual functions that can be utilized by a different host system, the use of a switch between the memory sub-system and the host systems is not needed.

In some embodiments, each virtual function can be assigned a namespace or a portion of the logical block address space of the memory sub-system. For example, each virtual machine that is assigned a different virtual function can have access to a different portion of the logical block address (LBA) space of the memory sub-system. The logical block address space can be mapped to a physical block address space of the memory sub-system.

In some embodiments, the memory sub-system controller can divide its total bandwidth between the different interface ports. Accordingly, each interface port can be coupled with a separate buffer of the memory sub-system controller that can be used to temporarily store data received from a respective interface port and/or received from the controller to be transmitted over the respective interface port.

Advantages of the present disclosure include, but are not limited to, a decrease in overall cost of utilizing a memory sub-system with multiple host systems since the utilization of separate switches is not needed. As the utilization of Multi-host SOC and Multi-VM (virtual machine) virtualized environments is becoming more common in enterprise data centers (e.g., automotive IVI (In-Vehicle Infotainment), ADAS (advanced driver assistance systems), etc.), a decrease in cost and power consumption of multi-host SOCs is desirable. Further, the elimination of the utilization of a separate switch further eliminates a single point of failure (i.e., the separate switch). Because access is provided to the multiple hosts using separate interface ports, a failure in one port will only affect the host system(s) connected to the failure-impacted port, while the other ports can continue to function as expected, thus improving the reliability of the memory sub-system. Additionally, the power consumption of the memory sub-system can be reduced because a separate switch is not included in the memory sub-system. Further, the use of SR-IOV eliminates the need for a hypervisor to virtualize the storage environment. Thus the software overhead introduced by the hypervisor can be eliminated, saving significant cost and power at the system level and allowing a bare metal connection between the memory sub-system and the host SOC.

Figure 1:
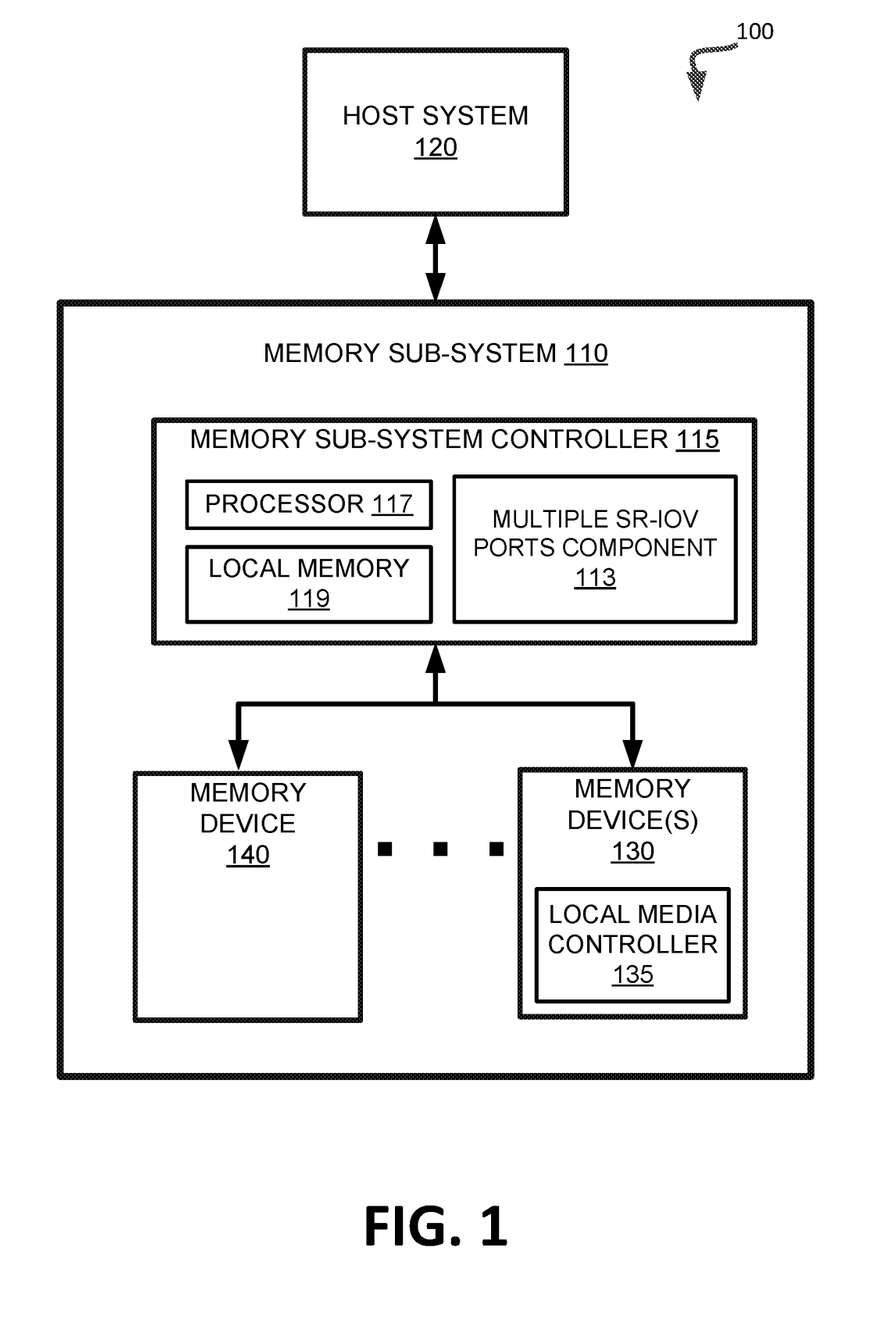
FIG. 1 illustrates an example computing system that includes a memory sub-system in accordance with some embodiments of the present disclosure.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, and a hard disk drive (HDD). Examples of memory modules include a dual in-line memory module (DIMM), a small outline DIMM (SO-DIMM), and a non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, "coupled to" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDEVIM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), etc. The physical host interface can be used to transmit data between the host system 120 and the memory sub-system 110. The host system 120 can further utilize an NVM Express (NVMe) interface to access the memory components (e.g., memory devices 130) when the memory sub-system 110 is coupled with the host system 120 by the PCIe interface. The physical host interface can provide an interface for passing control, address, data, and other signals between the memory sub-system 110 and the host system 120.

The memory devices can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include negative-and (NAND) type flash memory and write-in-place memory, such as three-dimensional cross-point ("3D cross-point") memory. A 3D cross-point memory device is a cross-point array of non-volatile memory cells that can perform bit storage based on a change of bulk resistance, in conjunction with a stackable cross-gridded data access array. Additionally, in contrast to many flash-based memories, cross-point non-volatile memory can perform a write-in-place operation, where a non-volatile memory cell can be programmed without the non-volatile memory cell being previously erased.

Although non-volatile memory components such as 3D cross-point type and NAND type flash memory are described, the memory device 130 can be based on any other type of non-volatile memory, such as read-only memory (ROM), phase change memory (PCM), magneto random access memory (MRAM), negative-or (NOR) flash memory, electrically erasable programmable read-only memory (EEPROM), and a cross-point array of non-volatile memory cells.

One type of memory cell, for example, single level cells (SLC) can store one bit per cell. Other types of memory cells, such as multi-level cells (MLCs), triple level cells (TLCs), and quad-level cells (QLCs), can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, or a QLC portion of memory cells. The memory cells of the memory devices 130 can be grouped as pages that can refer to a logical unit of the memory device used to store data. With some types of memory (e.g., NAND), pages can be grouped to form blocks. Some types of memory, such as 3D cross-point, can group pages across dice and channels to form management units (Mus).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor (processing device) 117 configured to execute instructions stored in local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 may not include a memory sub-system controller 115, and may instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

The memory sub-system 110 includes multiple SR-IOV ports component 113 that can be used to support multiple SR-IOV enabled ports in a memory sub-system, such that the memory sub-system can be shared for storage by multiple host systems. In implementations, memory sub-system 110 can be shared by multiple host systems using multiple SR-IOV enabled interface ports of the memory sub-system 110, without a need for a separate switch. (e.g., a Multi-Host capable PCIe switch). The multiple interface ports of memory sub-system 110 can run concurrently with each other, such that the multiple host systems can access memory sub-system 110 at the same time, or at least partially overlapping in time, by allowing each host system to connect to one interface port pf the memory sub-system. Each interface port (e.g., PCIe interface ports) can use SR-IOV to provide a group of virtual functions of memory sub-system 110 to the host system connected to the interface port. In implementations, memory sub-system 110 can have a maximum number of virtual functions that can be provided by the memory sub-system. In this case, the number of virtual functions assigned to each interface port can be determined by dividing the total number of virtual functions of the memory sub-system by the number of interface ports of memory sub-system 110.

In implementations, memory sub-system 110 can include two or more SR-IOV enabled interface ports. For example, the memory sub-system can be utilized by two or more host systems 120 where multiple virtual machines can be running on each host system. Each interface port (e.g., a PCIe port) can be SR-IOV enabled and thus can provide a group of virtual functions to the virtual machines of one of the host systems. SR-IOV is a specification that allows the isolation of peripheral component interconnect (PCI) Express (PCIe) resources among various hardware functions for manageability and performance reasons, while also allowing a single physical PCIe device to be shared in a virtual environment. SR-IOV offers different virtual functions (VFs) to different virtual components (e.g., a network adapter) on a physical server machine. SR-IOV also allows different virtual machines in a virtual environment to share a single PCIe hardware interface.

In one implementation, multiple SR-IOV ports component 113 can provide an identification of each interface port (e.g., an address or other such identification) and the group of virtual functions that are supported by the SR-IOV enabled interface port to a group of virtual machines of host system 120. Each virtual machine of host system 120 can be assigned one virtual function of the interface port. As such, since memory sub-system 110 provides multiple interface ports that each expose a separate group of virtual functions that can be utilized by a different host system, the use of a switch between memory sub-system 110 and host systems 120 is not needed.

In some implementations, multiple SR-IOV ports component 113 can assign a namespace or a portion of the logical block address space of memory sub-system 110 to each virtual function. For example, each virtual machine that is assigned a virtual function can have access to a different portion of the logical block address space (LBA) of memory sub-system 110. The logical block address space can be mapped to a physical block address space of the memory sub-system. In some implementations, memory sub-system controller 115 can determine that a group of virtual functions are assigned to an interface port with a particular LBA range for each virtual function. In the same or alternative embodiments, controller 115 can modify the number of virtual functions that are assigned to each of the interface ports. For example, the number of virtual functions that can be provided to virtual machines of a host system coupled with a particular interface port can be increased or decreased based on the usage of the storage resources of memory sub-system 110 by the virtual machines of the host system. In some embodiments, different LBA ranges (e.g., different amount of logical block addresses that are mapped to a corresponding different amount of physical block addresses) can be assigned to different virtual functions. For example, the virtual functions of an interface port can be assigned larger LBA ranges than the virtual functions of another interface port. The different LBA ranges can be based on use of the different virtual machines or applications of the host system connected to the interface port.

In some implementations, each interface port of memory sub-system controller 115 can be coupled with a separate memory buffer of memory sub-system controller 115. This way, controller 115 can divide its bandwidth between the different interface ports, such that all ports can work in parallel. Accordingly, each interface port can temporarily store data received from controller 115 in the buffer assigned to the interface port. Similarly, controller 115 can store data received from a respective interface port in the buffer dedicated to the port until controller 115 is ready to process the data from the port.

Figure 2:
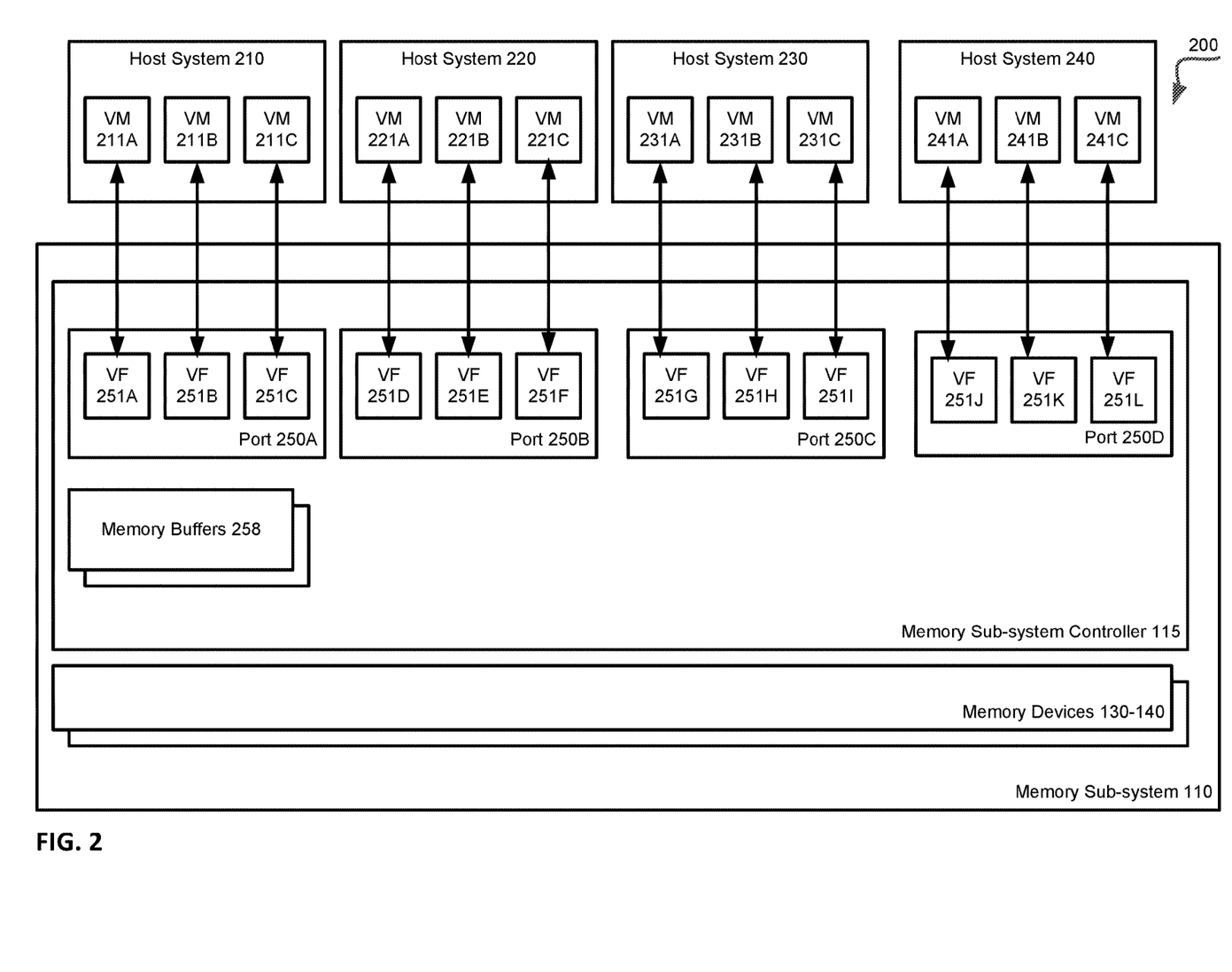
FIG. 2 illustrates an example computing system that includes a memory sub-system with multiple ports that have single root virtualization, in accordance with some embodiments of the present disclosure

FIG. 2 illustrates an example computing system 200 that includes memory sub-system 110 with multiple ports that have single root virtualization in accordance with some embodiments of the present disclosure. Memory sub-system 110 can be connected to multiple host systems 210-240. Each host system 210-240 can be the same or similar to host system 120 of FIG. 1. In implementations, each host system 210-240 can be a separate system on a chip (SOC) or another host system that provides a group of virtual machines. For example, each host system 210-240 can be a separate processor core or processing device that provides or executes a group of virtual machines. Each host system 210-240 can be coupled with memory sub-system 110 through one of interface ports 250A-D, provided by memory sub-system controller 115 of memory sub-system 110. For example, a PCIe interface can be utilized between each host system and interface port so that each host system 210-240 is coupled with a different interface port 250A-D of the memory sub-system 110. In another example, two host systems can be coupled with a single interface port 250A-D (e.g., using a separate PCIe switch), thus increasing the number of host systems that can access the memory sub-system 110.

In an illustrative example, hosts systems 210-240 can be system on a chip (SOC) hosts and memory sub-system 110 can have four PCIe endpoint ports. Each interface port can have one lane and can auto detect each link to connect to each host SOC RC (root complex). In implementations, interface port link/lanes combinations can include: 4×ports, 1 lane; 3×ports, 1 lane; 2×ports, 2 lanes; and 1×port, 4 lanes. The PCIe PHY layer can be bifurcated up to four ways, one per interface port in order to share the bandwidth of the backend storage of memory sub-system 110. Each interface port exposes a group of VFs on that port to each host SOC, which in turn has multiple VMs running across its CPUs cores.

In an implementation, interface port 250A can be connected to host system 210. Interface port 250A can be allocated virtual functions (VF) 251A-C. In order to allow for isolation of the resources of shared memory sub-system 110, each VF 251A-C of port 250A can be utilized by one virtual machine (VM) 211A-C of host system 210. In this case, VF 251A can be assigned to VM 211A of host system 210, VF 251B can be assigned to VM 211B of host system 210, and VF 251C can be assigned to VM 211C of host system 210. In implementations, each VF 251A-L of memory sub-system 110 can be allocated a corresponding range of LBA of memory devices 130-140, such that each VF 251A-L has a dedicated namespace in memory sub-system 110.

SR-IOV enabled port 250B can be allocated VFs 251D-F. In order to allow for isolation of the resources used by the different VMs and host systems, each VF 251D-F of port 250B can be utilized by one VM 221A-C of host system 220. In this case, VF 251D can be assigned to VM 221A of host system 220, VF 251E can be assigned to VM 221B of host system 220, and VF 251F can be assigned to VM 221C of host system 220. Similarly, SR-IOV enabled port 250C can be connected to host system 230, and can be allocated VFs 251G-I. VF 251G can be assigned to VM 231A of host system 230, VF 251H can be assigned to VM 231B of host system 230, and VF 251I can be assigned to VM 231C of host system 230. Along the same lines, SR-IOV enabled port 250D can be connected to host system 240, and can be allocated VFs 251J-L. VF 251J can be assigned to VM 241A of host system 240, VF 251K can be assigned to VM 241B of host system 240, and VF 251L can be assigned to VM 241C of host system 240.

In implementations, each VM 211A-C, 221A-C, 231A-C, and 241A-C can use its assigned VF to access a separate namespace within one of memory devices 130-140. For example, each VF 251A-L can be allocated a specific range of LBA of memory devices 130-140a dedicated to that VF. This enables a VM that is associated with the VF to access a separate portion of memory, as explained in more details herein below.

In certain implementations, each interface port 250A-D of memory sub-system controller 115 can be coupled with a separate buffer of memory buffers 258 of controller 115. The separate buffer enables controller 115 to service interface ports 250A-D and isolate data to and from each port, such that interface ports 250A-D can work in parallel. Accordingly, each interface port 250A-D can store data received from controller 115 in a buffer assigned to the interface port for further processing by port 250A-D. Similarly, controller 115 can store data received from a respective interface port in the buffer dedicated to the port until controller 115 is ready to process the data from the port. In an illustrative example, memory buffers 258 enable concurrent memory access requests to be received at interface ports 250A-D. The memory access requests can be held in the associated memory buffer while a current request is being processed at the corresponding interface port. Once the interface port has completed processing of the current request, a next request can be retrieved from the associated memory buffer for processing, and another memory access request can be added to the memory buffer.

Figure 3:
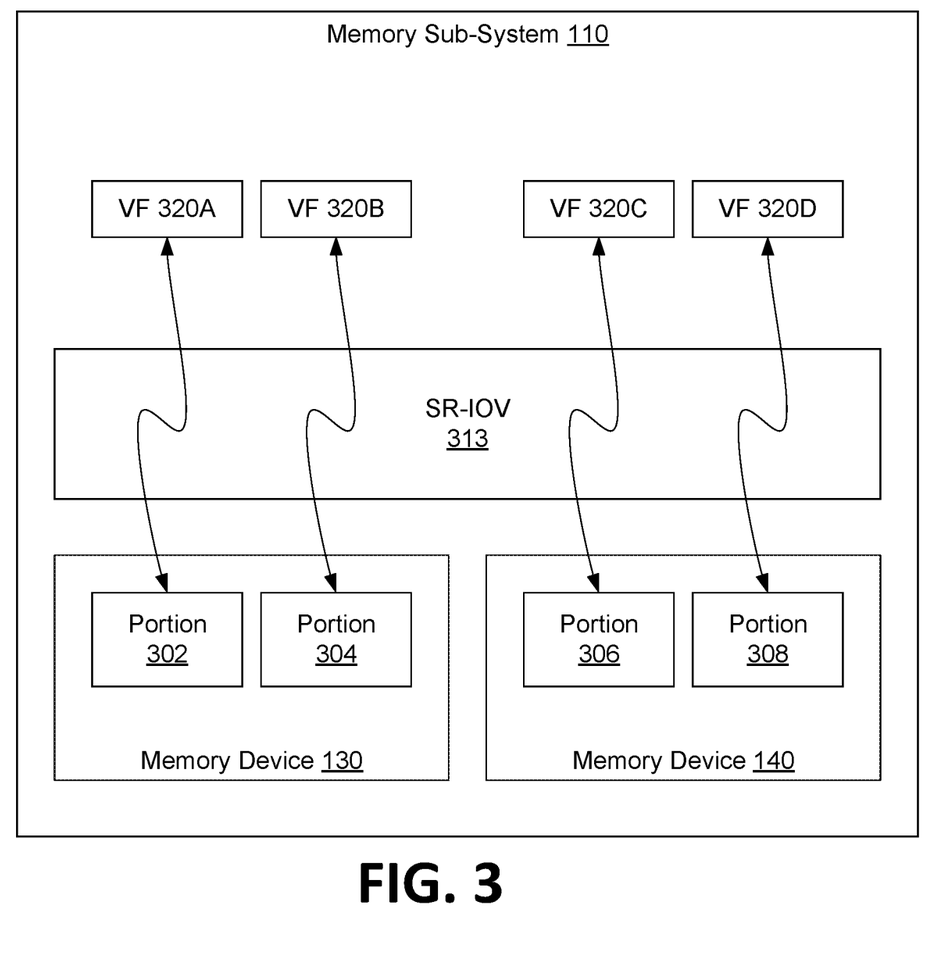
FIG. 3 illustrates virtual functions memory portion mapping in memory sub-system for SR-IOV virtualization in accordance with some embodiments of the present disclosure.

FIG. 3 illustrates virtual functions memory portion mapping in memory sub-system for SR-IOV virtualization in accordance with some embodiments of the present disclosure. As described above, multiple SR-IOV ports component 113 allocates to each virtual function (VF) 320A-D in the memory sub-system 110 a corresponding portion of one of memory devices 130-140. The multiple VFs 320A-D are provided in the memory sub-system 110 using SR-IOV 313, as explained in more details herein above. As illustrated in FIG. 3, VF 320A is allocated portion 302 of memory device 130, VF 320B is allocated portion 304 of memory device 130, VF 320C is allocated portion 306 of memory device 140, and VF 320D is allocated portion 308 of memory device 140. In other embodiments, the respective portions can span two or more of memory devices 130-140. Each portion 302-308 can have a fixed size or can have a different size. For example, portion 302 could be larger than portion 304, which can be larger than portion 306, which can be the same size as portion 308. In one embodiment, each portion 302-308 is represented by a unique namespace. The namespace is a quantity of one or more memory devices 130-140 that can be formatted into logical blocks (e.g., ranges of LBA space), when memory devices are configured with a NVMe protocol. The NVMe protocol provides access to the namespace, which appears as a standard-block device on which file systems and applications can be deployed without any modification. Each virtual function 320A-D can have one or more separate namespaces, each identified by a unique namespace ID (NSID).

In an illustrative example, memory sub-system 110 can provide an identification of each VF 320A-D (e.g., a virtual PCIe interface) that can be supported through the PCIe interface of the device identification. In some embodiments, each portion 302-308 can be arrange of LBA space of memory devices 130-140. Accordingly, each virtual machine of a host system that is assigned a virtual function (e.g., by connecting to the VF using the device identification of the VF) can be assigned a different portion of the logical block address space of memory sub-system 110. The logical block address space can be mapped to a physical block address space of memory sub-system 110.

In some embodiments, controller 115 of memory sub-system 110 can specify that a group of virtual functions are assigned to an interface port with a particular LBA range for each virtual function. In the same or alternative embodiments, the controller can modify the number of virtual functions that are assigned to each of the interface ports. For example, the number of virtual functions that can be provided to virtual machines of a host system coupled with a particular interface port can be increased or decreased based on the usage of the storage resources of the memory sub-system by the virtual machines of the host system. In some embodiments, different LBA ranges (e.g., different amount of logical block addresses that are mapped to a corresponding different amount of physical block addresses) can be assigned to different virtual functions. For example, the virtual functions of an interface port can be assigned larger LBA ranges than the virtual functions of another interface port. The different LBA ranges can be based on use of the different virtual machines or applications of the corresponding host system.

Figure 4:
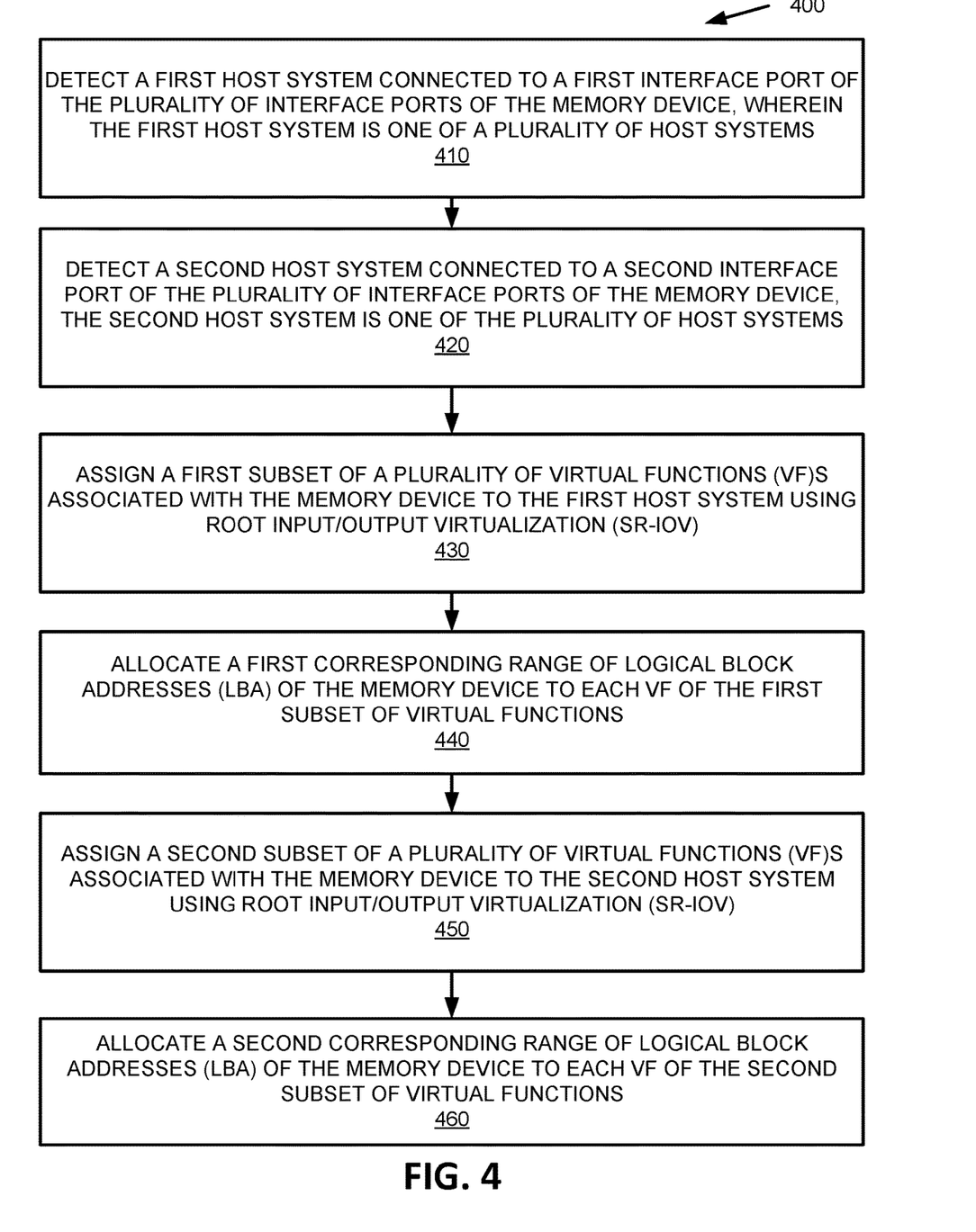
FIG. 4 is a flow diagram of an example method of managing multiple SR-IOV enabled interface ports of a memory sub-system, in accordance with some embodiments of the present disclosure.

FIG. 4 is a flow diagram of an example method of managing multiple SR-IOV enabled interface ports of a memory sub-system, in accordance with some embodiments of the present disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by multiple SR-IOV ports component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 410, the processing logic detects a first host system that is one of the multiple host systems that can be connected to a memory device. The first host system is connected to a first interface port of multiple interface ports of the memory device. In one implementation, each of the multiple interface ports can be a Peripheral Component Interconnect Express (PCIe) port, and each PCIe is SR-IOV enabled, as explained in more details herein above.

In one example, the multiple interface ports can be accessed concurrently by the multiple host systems without the need for a separate switch. Therefore, the memory sub-system can provide simultaneous access to its storage devices to the host systems using the multiple interface ports, as explained in more details herein.

At operation 420, the processing logic detects a second host system that is one of the multiple host systems that can be connected to a memory device. The second host system is connected to a second interface port of multiple interface ports of the memory device, the second interface port is different than the first interface port of the memory device.

At operation 430, the processing logic assigns a first subset of a the total virtual functions (VF)s associated with the memory device to the first host system using root input/output virtualization (SR-IOV). In implementations, the first subset of VFs corresponds to a group of virtual PCIe interfaces that share physical resources of each interface port. Additionally, for each of the multiple host systems, the processing logic can assign a corresponding VF of the corresponding subset of VFs assigned to the respective host system to a corresponding virtual machine of the multiple virtual machines running on the respective host system, as described in more details herein.

At operation 440, the processing logic allocates a first corresponding range of logical block addresses (LBA) of the memory device to each VF of the first subset of virtual functions assigned to the first host system. In implementations, the logical block address space can be mapped to a physical block address space of one or more memory devices of the memory sub-system, as explained in more details herein above.

At operation 430, the processing logic assigns a first subset of a the total virtual functions (VF)s associated with the memory device to the first host system using root input/output virtualization (SR-IOV). In implementations, the first subset of VFs corresponds to a group of virtual PCIe interfaces that share physical resources of each interface port. Additionally, for each of the multiple host systems, the processing logic can assign a corresponding VF of the corresponding subset of VFs assigned to the respective host system to a corresponding virtual machine of the multiple virtual machines running on the respective host system, as described in more details herein.

At operation 440, the processing logic allocates a first corresponding range of logical block addresses (LBA) of the memory device to each VF of the first subset of virtual functions assigned to the first host system. In implementations, the logical block address space can be mapped to a physical block address space of one or more memory devices of the memory sub-system, as explained in more details herein above.

At operation 450, the processing logic assigns a second subset of the total VFs associated with the memory device to the second host system using root input/output virtualization (SR-IOV). In implementations, the first subset of VFs corresponds to a group of virtual PCIe interfaces that share physical resources of each interface port.

At operation 460, the processing logic allocates a second corresponding range of logical block addresses (LBA) of the memory device to each VF of the second subset of virtual functions assigned to the second host system. In implementations, the logical block address space can be mapped to a physical block address space of one or more memory devices of the memory sub-system, as explained in more details herein above.

Figure 5:
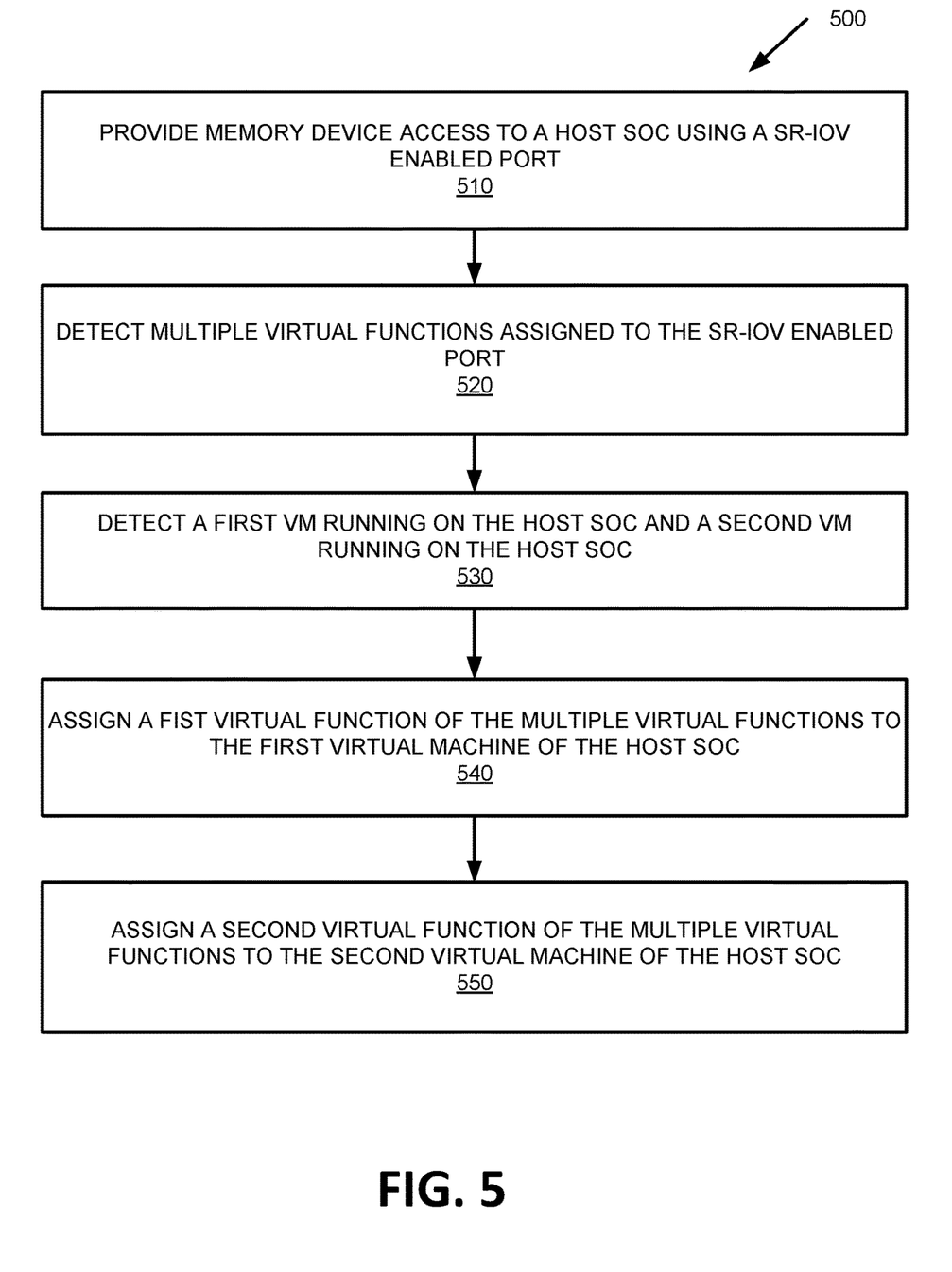
FIG. 5 is an example method of assigning virtual functions to virtual machines, in support of multiple SR-IOV enabled interface ports of a memory sub-system, in accordance with some embodiments of the present disclosure.

FIG. 5 an example method of assigning virtual functions to virtual machines, in support of multiple SR-IOV enabled interface ports of a memory sub-system, in accordance with some embodiments of the present disclosure. The method 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 is performed by multiple SR-IOV ports component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 510, the processing logic provides memory device access to a host SOC using a SR-IOV enabled port. In implementations, the memory sub-system can detect that a host SOC is connected to a PCIe port of the multiple PCIe ports of the memory subsystem, as described in more details herein. Further, in response to detecting the host SOC, the memory sub-system can assign a PCIe port to the host SOC by providing a device identification of the SR-IOV enabled PCIe port to the host SOC.

At operation 520, the processing logic detects multiple virtual functions assigned to the PCIe port. In implementations, the memory sub-system can identify the virtual functions that are supported by the PCIe bus or interface. For example, the memory sub-system can provide an identification of each virtual function (e.g., a virtual PCIe interface) that can be supported through the PCIe interface of the identified port, as described in more details herein.

At operation 530, the processing logic detects a first virtual machine (VM) and a second VM running on the host SOC. In implementations, each VM of the host SOC can be assigned a dedicated VF of the PCIe port, in order for the VM to access a corresponding portion of the storage space of the memory sub-system. Thus, at operation 540, the processing logic assigns a first VF of the multiple virtual functions of the PCIe port to the first VM of the host SOC. All memory access requests from the first VM are serviced by the first VF of the PCIe port. Similarly, at operation 550, the processing logic assigns a second VF of the multiple virtual functions of the PCIe port to the second VM of the host SOC. All memory access requests from the second VM are serviced by the second VF of the PCIe port. As explained in more details herein, each VM can have a dedicated portion of the memory devices of the memory sub-system by using its assigned VF of the PCIe port assigned to the respective host SOC.

Figure 6:
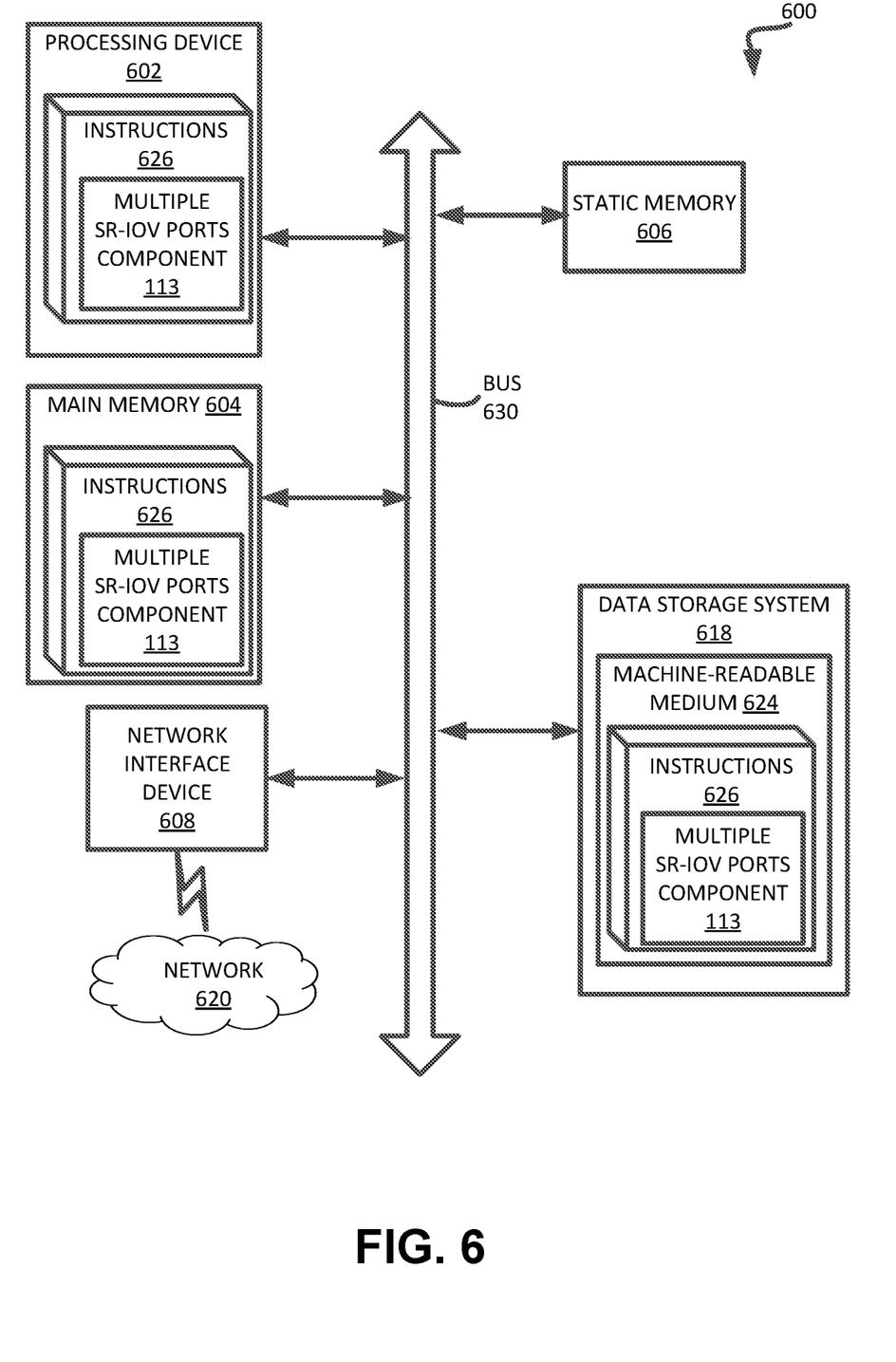
FIG. 6 is a block diagram of an example computer system in which embodiments of the present disclosure can operate.

FIG. 6 illustrates an example machine of a computer system 600 within which a set of instructions, for causing the machine to perform any one or more of the methodologies discussed herein, can be executed. In some embodiments, the computer system 600 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to multiple SR-IOV ports component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage system 618, which communicate with each other via a bus 630.

Processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein. The computer system 600 can further include a network interface device 608 to communicate over the network 620.

The data storage system 618 can include a machine-readable storage medium 624 (also known as a computer-readable medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to the memory sub-system 110 of FIG. 1.

In one embodiment, the instructions 626 include instructions to implement functionality corresponding to multiple SR-IOV ports component 113 of FIG. 1. While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
   a memory device;
   a plurality of interface ports operatively coupled with the memory device; and
   a processing device, operatively coupled with the memory device, to perform operations comprising:
      detecting a first host system connected to a first interface port of the plurality of interface ports of the memory device;
      detecting a second host system connected to a second interface port of the plurality of interface ports of the memory device;
      allocating a first range of logical block addresses (LBA) of the memory device to one or more virtual functions (VFs) assigned to the first host system; and
      allocating a second range of LBAs of the memory device to one or more VFs assigned to the second host system, wherein the first host system is to access the first range of LBA of the memory device concurrently with the second host system accessing the second range of LBA of the memory device, and wherein the first range of LBAs is different than the second range of LBAs.

2. The system of claim 1, wherein the plurality of interface ports comprises Peripheral Component Interconnect Express (PCIe) ports, wherein the first interface port comprises a first PCIe port, and wherein the second interface port comprises a second PCIe port.

3. The system of claim 2, wherein each PCIe port of the plurality of interface ports is SR-IOV enabled.

4. The system of claim 2, wherein the one or more VFs assigned to the first host system correspond to a plurality of virtual PCIe interfaces that share physical resources of the first PCIe port, and wherein the one or more VFs assigned to the second host system correspond to a second plurality of virtual PCIe interfaces that share physical resources of the second PCIe port.

5. The system of claim 1, wherein the processing device is to perform further operations comprising:
   assigning a corresponding VF of the one or more VFs assigned to the first host system to a corresponding virtual machine of a plurality of virtual machines of the first host system; and
   assigning a corresponding VF of the one or more VFs assigned to the second host system to a corresponding virtual machine of a plurality of virtual machines of the second host system.

6. The system of claim 1, wherein the first host system and the second host system access respective ports concurrently.

7. The system of claim 1, wherein the first host system and the second host system are provided access to the memory device without a separate switch.

8. A method comprising:
   detecting a first host system connected to a first interface port of a plurality of interface ports of a memory device;
   detecting a second host system connected to a second interface port of the plurality of interface ports of the memory device;
   allocating a first range of logical block addresses (LBA) of the memory device to one or more virtual functions (VFs) assigned to the first host system; and
   allocating a second range of LBAs of the memory device to one or more VFs assigned to the second host system, wherein the first host system is to access the first range of LBA of the memory device concurrently with the second host system accessing the second range of LBA of the memory device, and wherein the first range of LBAs is different than the second range of LBAs.

9. The method of claim 8, wherein the plurality of interface ports comprises Peripheral Component Interconnect Express (PCIe) ports, wherein the first interface port comprises a first PCIe port, and wherein the second interface port comprises a second PCIe port.

10. The method of claim 9, wherein each PCIe port of the plurality of interface ports is SR-IOV enabled.

11. The method of claim 9, wherein the one or more VFs assigned to the first host system correspond to a plurality of virtual PCIe interfaces that share physical resources of the first PCIe port, and wherein the one or more VFs assigned to the second host system correspond to a second plurality of virtual PCIe interfaces that share physical resources of the second PCIe port.

12. The method of claim 8, further comprising:
   assigning a corresponding VF of the one or more VFs assigned to the first host system to a corresponding virtual machine of a plurality of virtual machines of the first host system; and
   assigning a corresponding VF of the one or more VFs assigned to the second host system to a corresponding virtual machine of a plurality of virtual machines of the second host system.

13. The method of claim 8, wherein the first host system and the second host system access respective ports concurrently.

14. The method of claim 8, wherein the first host system and the second host system are provided access to the memory device without a separate switch.

15. A non-transitory computer readable medium comprising instructions, which when executed by a processing device cause the processing device to perform operations comprising:
   detecting a first host system connected to a first interface port of a plurality of interface ports of a memory device;
   detecting a second host system connected to a second interface port of the plurality of interface ports of the memory device;
   allocating a first range of logical block addresses (LBA) of the memory device to one or more virtual functions (VFs) assigned to the first host system; and
   allocating a second range of LBAs of the memory device to one or more VFs assigned to the second host system, wherein the first host system is to access the first range of LBA of the memory device concurrently with the second host system accessing the second range of LBA of the memory device, and wherein the first range of LBAs is different than the second range of LBAs.

16. The non-transitory computer readable medium of claim 15, wherein the plurality of interface ports comprises Peripheral Component Interconnect Express (PCIe) ports, wherein the first interface port comprises a first PCIe port, and wherein the second interface port comprises a second PCIe port.

17. The non-transitory computer readable medium of claim 16, wherein each PCIe port of the plurality of interface ports is SR-IOV enabled.

18. The non-transitory computer readable medium of claim 16, wherein the one or more VFs assigned to the first host system correspond to a plurality of virtual PCIe interfaces that share physical resources of the first PCIe port, and wherein the one or more VFs assigned to the second host system correspond to a second plurality of virtual PCIe interfaces that share physical resources of the second PCIe port.

19. The non-transitory computer readable medium of claim 15, the operations further comprising:
  assigning a corresponding VF of the one or more VFs assigned to the first host system to a corresponding virtual machine of a plurality of virtual machines of the first host system; and
  assigning a corresponding VF of the one or more VFs assigned to the second host system to a corresponding virtual machine of a plurality of virtual machines of the second host system.

20. The non-transitory computer readable medium of claim 15, wherein the first host system and the second host system access respective ports concurrently.

* * * * *